United States Patent [19]

Carlson

[11] Patent Number: 4,509,193

[45] Date of Patent: Apr. 2, 1985

[54] MINIATURE ACOUSTICAL TRANSDUCER WITH FILTER/REGULATOR POWER SUPPLY CIRCUIT

[75] Inventor: Elmer V. Carlson, Prospect Heights, Ill.

[73] Assignee: Industrial Research Products, Inc., Elk Grove Village, Ill.

[21] Appl. No.: 512,352

[22] Filed: Jul. 11, 1983

[51] Int. Cl.[3] .......... H04M 1/03

[52] U.S. Cl. .......... 381/113; 381/68; 381/69; 179/107 R; 179/111 E

[58] Field of Search .......... 381/68, 69, 113; 179/107 R, 107 FD, 107 E, 107 PC; 323/223, 225, 226, 229, 231

[56] References Cited

U.S. PATENT DOCUMENTS

| | | | |
|---|---|---|---|
| 3,300,585 | 1/1967 | Reedyk et al. | 179/107 R |
| 3,816,671 | 6/1974 | Fraim | 179/111 E |
| 3,862,367 | 1/1975 | Kono | 381/113 |
| 3,875,433 | 4/1975 | Uchikawa | 179/111 E |
| 3,942,029 | 3/1976 | Kawakami | 179/111 E |
| 4,063,050 | 12/1977 | Carlson | 179/111 E |
| 4,068,090 | 1/1978 | Komatsu | 179/113 |
| 4,207,442 | 6/1980 | Freeman | 179/111 E |

FOREIGN PATENT DOCUMENTS

| | | | |
|---|---|---|---|
| 3231030 | 2/1984 | Fed. Rep. of Germany | 179/107 R |
| 583489 | 12/1976 | Switzerland | 179/111 E |

*Primary Examiner*—Thomas W. Brown
*Assistant Examiner*—L. C. Schroeder
*Attorney, Agent, or Firm*—Kinzer, Plyer, Dorn & McEachran

[57] ABSTRACT

A battery-powered miniature acoustical transducer system for a hearing aid, including a microphone and an amplifier, has a combination filter and voltage regulator incorporated in its power supply circuit; the filter/regulator includes a field-effect transistor having its drain and source electrodes interposed in series between one battery terminal and a first power terminal of the amplifier, a resistor connecting the source and gate electrodes of the FET, a transistor having its emitter and collector interposed in series between the other power terminal of the amplifier and the gate electrode of the FET, and a junction diode connected from the FET source electrode to the transistor base, the diode junction and the base-emitter junction of the transistor both having highly non-linear voltage/current characteristics.

17 Claims, 7 Drawing Figures

MINIATURE ACOUSTICAL TRANSDUCER WITH FILTER/REGULATOR POWER SUPPLY CIRCUIT

BACKGROUND OF THE INVENTION

The extreme miniaturization of sound amplification systems such as found in headworn hearing aids is achieved by incorporating, miniaturized components into compact, wearable system assemblies. Such a system usually comprises a microphone, two or more stages of amplification, a gain control, a battery power source, and a sound reproducer, called a receiver. These components, when packaged in a tiny, appropriately shaped housing, constitute a minimum hearing aid. To achieve hearing aids that are cosmetically unobtrusive, each of these components has been miniaturized as much as the economics and state of the art have permitted.

One of the practical problems in designing such a miniaturized system results from interactions within the operating circuits. To produce amplified sound in the user's ear, the amplifier must deliver signal-frequency electrical power to the receiver. The amplifier obtains this energy from a tiny battery incorporated in the device. Because the battery is very small, its internal impedance as a voltage source is not negligible. The draining of energy from the battery causes the power supply voltage to fluctuate in a manner dependent on the amplified signal. In addition to supplying the energy to operate the amplifier stage which powers the receiver, the battery also serves as a power supply for a preamplifier which strengthens the weak signal from the microphone so that it can activate the power amplifier. These battery voltage fluctuations, when applied to the preamplifier where the signals are very weak, intermix with the desired microphone signal to such a degree as to produce distortion, system instability, or both.

A conventional approach to this problem is to introduce an R-C filter circuit, comprising a series resistance and a shunt capacitance, between the battery and the preamplifier. This has two drawbacks. First, it is necessary to provide additional space, in some part of the system, to accommodate the filter resistor and capacitor. The filter capacitor typically has a value of one to ten microfarads. The spaced required for such a capacitor increases the size of the hearing aid significantly. Second, the battery voltage, in addition to fluctuating with the signal, may also decrease in average value depending on the average rate of energy consumption during the life of the battery. This causes a decrease in amplification available from the preamplifier stage and, therefore, an unpredictable amplification from the complete system.

Microphones used in modern hearing aids traditionally incorporate the preamplifier within the microphone housing. Such microphones are described in U.S. Pat. Nos. 3,816,671 and 4,063,050. In some instances, if the housing is large enough, a filter capacitor and resistor may be included inside the microphone housing. However, this arrangement is likely to result in some degradation in electro-acoustic performance of the microphone. Moreover, in the smaller modern microphones the housing is not large enough to provide adequate space for such a filter capacitor within the housing.

In another approach to this problem, the integrated circuits used as amplifiers have been equipped with voltage regulating circuits. This solves the problem of varying amplifier gain, but the circuits currently available require the use of capacitors of substantially the same size as used with the previously described resistor/capacitor filter networks in order to achieve reasonable electrical stability. Thus, this alternative also has substantial space problems.

The batteries used to power the amplifiers in these miniature transducer systems produce voltages between 1.25 and 1.55 volts. Any filter or voltage regulator circuit must not reduce this voltage below a level at which satisfactory amplifier operation can be reliably obtained. With present day techniques, a voltage of 0.9 to 1.0 volts is usually adequate.

SUMMARY OF THE INVENTION

It is a principal object of the present invention, therefore, to provide a new and improved miniature acoustical transducer system, suitable for use in hearing aids and like applications, incorporating a microphone, an amplifier, and a battery power supply, which incorporates a combination filter and voltage regulator circuit having improved operating characteristics as compared with prior art circuits but which requires no large capacitor that could necessitate an increase in overall size of the transducer.

A particular object of the invention is to provide a new and improved filter and voltage regulator circuit that fits into a common housing with a miniature microphone and preamplifier in an acoustical transducer system suitable for use in hearing aids and like applications.

A specific object of the invention is to provide a new and improved filter and voltage regulator circuit in a battery-powered acoustical transducer system comprising a microphone and preamplifier that also affords a regulated power supply for a power amplifier driving a receiver in a hearing aid or like device.

A further object of the invention is to provide a new and improved filter and voltage regulator circuit in a miniature acoustical transducer system that is extremely compact in size, inexpensive in construction, yet highly effective and reliable in operation.

Accordingly, the invention relates to a miniature acoustical transducer system suitable for use in hearing aids and like applications, of the kind comprising a microphone connected to the signal input of an amplifier, the amplifier having first and second power terminals connected to a battery, the improvement comprising a combined filter and voltage regulator circuit interposed between the battery and the first power terminal of the amplifier. The filter/regulator circuit comprises a first semiconductor gate device having input, output, and control electrodes, the input electrodes of the first gate device being connected to the battery and the output electrode of the first gate device being connected to the first power terminal of the amplifier and a second semiconductor gate device having input, output, and control electrodes, the input electrode of the second gate device being connected to the second power terminal of the amplifier and to the battery and the output electrode of the second gate device being connected to the control electrode of the first gate device. A resistance is connected between the output and control electrodes of the first gate device and a junction diode is connected between the output electrode of the first gate device and the control electrode of the second gate device; the junction diode and the control electrode-input electrode junction of the second gate device each have a highly non-linear voltage/current characteristic.

DESCRIPTION OF THE PREFERRED EMBODIMENTS

Figure 1:
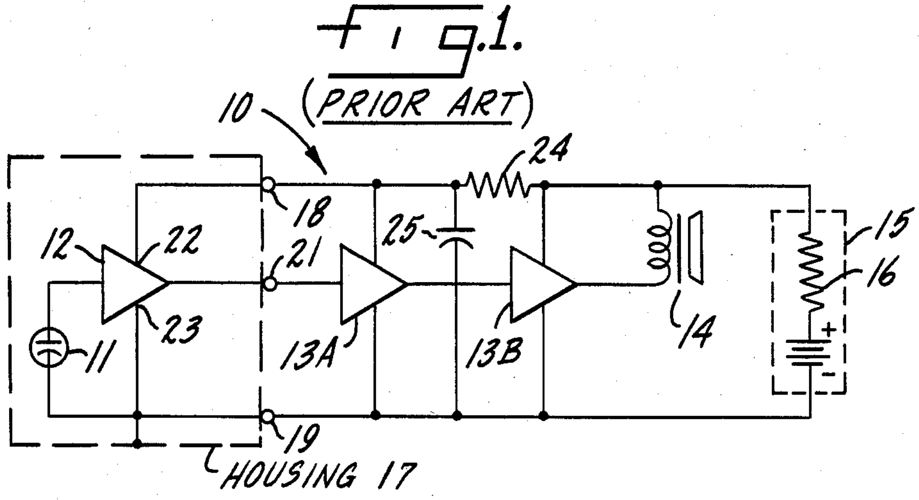
Fig. 1. (PRIOR ART)
FIG. 1 is a schematic circuit diagram of a hearing aid incorporating a filter circuit in accordance with conventional practice.

FIG. 1 provides a schematic circuit diagram of a miniature acoustical transducer system 10, such as a headworn hearing aid, of known construction. Transducer 10 includes a microphone 11 connected to the signal input of an amplifier 12 which serves as a preamplifier for the overall hearing aid system. The output of preamplifier 12 is supplied to an amplifier comprising two stages 13A and 13B; stage 13B is a power amplifier that drives a sound reproducer or receiver 14. The power supply for microphone 11, amplifiers 12 and 13, and receiver 14 is a miniature battery 15 having an internal resistance 16. In system 10, microphone 11 and preamplifier 12 are both mounted within a microphone housing 17 having first and second external power terminals 18 and 19 and a signal output terminal 21. The external power terminals 18 and 19 are connected to the positive and negative terminals of battery 15 and to first and second power terminals 22 and 23, respectively, of preamplifier 12. Microphone 11 is connected to the external negative power terminal 19; receiver 14 is connected to the positive terminal of battery 15. Power supply connections are also provided from battery 15 to amplifier stages 13A and 13B.

The hearing aid circuit 10 shown in FIG. 1 further comprises an R-C filter in the power supply circuit. This filter includes a resistor 24 connected in series between the external power terminal 18 and the positive terminal of battery 15, and a shunt capacitor 25 connected from terminal 18 to the negative external power terminal 19.

For the RC filter 24,25 of the conventional circuit shown in FIG. 1 to be effective, capacitor 25 usually must have a capacitance of one to ten microfarads; consequently, the capacitor is of substantial physical size. As a result, in most hearing aids it is not practical or possible to mount the filter within microphone housing 17. In virtually all instances the filter 24,25 adds materially to the overall size of the complete hearing aid or like miniature system 10. In fact, when applied to a hearing aid the RC filter is likely to increase the overall size of the device to an extent such that it becomes cosmetically undesirable and in many instances unacceptable. Furthermore, with aging of battery 15 an appreciable decrease in overall amplification available from the device is likely to occur, a quite undesirable operating attribute.

Figure 2:
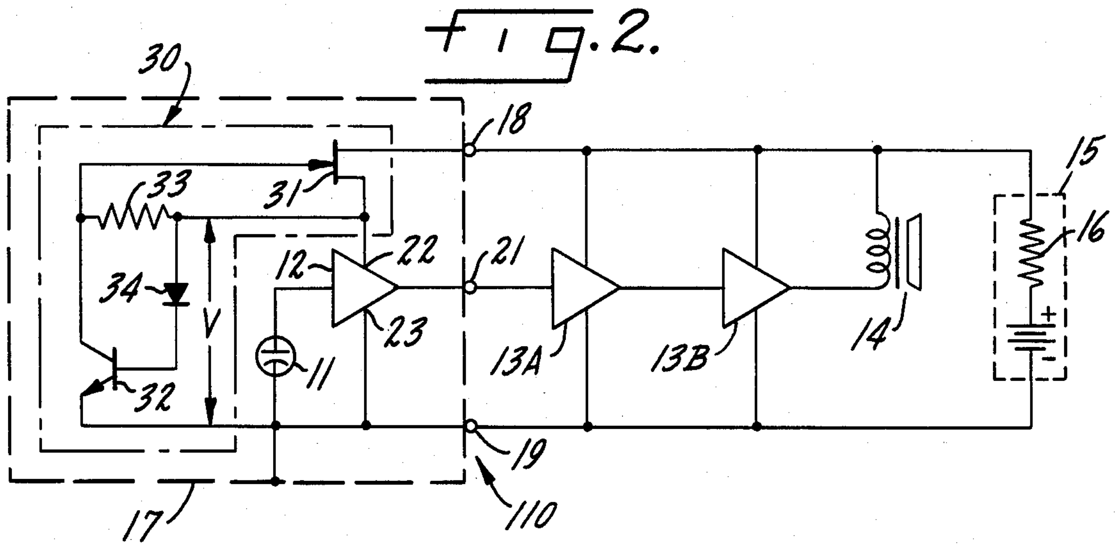
FIG. 2 is a schematic circuit diagram of a miniature acoustical transducer system, incorporating a filter/regulator circuit, constructed in accordance with one embodiment of the present invention.

FIG. 2 presents a schematic circuit diagram of a miniature acoustical transducer system 110, which again may constitute a head-worn hearing aid, constructed in accordance with one embodiment of the present invention. Transducer system 110 comprises a microphone 11 connected to the signal input of an amplifier 12 which again serves as a preamplifier for the overall transducer system. As before, the output of preamplifier 12 is supplied to an amplifier shown as including two stages 13A and 13B, with stage 13B driving a receiver 14. A miniature battery 15 having an internal resistance 16 functions as the power supply for microphone 11, amplifiers 12 and 13, and receiver 14. As in the conventional system of FIG. 1, microphone 11 and preamplifier 12 are mounted within a common housing 17 having first and second external power terminals 18 and 19 and a signal output terminal 21, the external power terminals 18 and 19 being connected to the positive and negative terminals, respectively, of battery 15. Power supply connections are also provided from battery 15 to both of the amplifier stages 13A and 13B.

System 110, FIG. 2, incorporates a filter and voltage regulator circuit 30 that is physically small enough to be mounted within the microphone housing 17. In particular, regulator 30 does not require a large filter capacitor. Accordingly, it can be combined with preamplifier 12 in housing 17.

The filter and voltage regulator circuit 30 includes a first semiconductor gate device, a field-effect transistor 31, having its drain (input) electrode connected to the positive voltage external power terminal 18 and its source (output) electrode connected to power terminal 22 of amplifier 12. A resistor 33 is connected from the source electrode of gate 31 back to the gate (control) electrode of the FET.

Circuit 30 further comprises a second semiconductor gate device, an NPN transistor 32. The emitter (input) electrode of transistor 32 is connected to the negative external power terminal 19 and the collector (output) electrode is connected to the gate electrode of FET 31. A junction diode 34 is connected between the source electrode of device 31 and the base (control) electrode of transistor 32.

Figure 3:
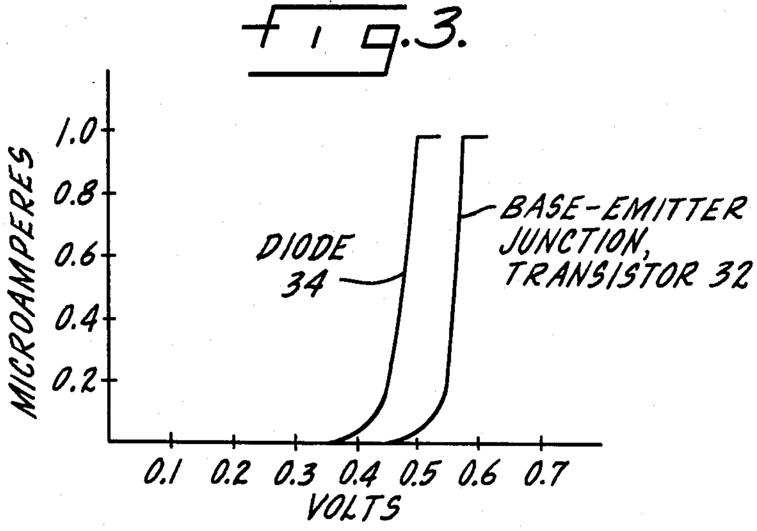
FIG. 3 is a chart of voltage characteristics for semiconductor junctions, utilized in explanation of the operation of the circuit of FIG. 2.

The operating current for preamplifier 12 flows from the positive terminal 18 through the drain-to-source path of FET 31 to the power terminal 22 of the amplifier. There is an alternate path from the source electrode of transistor 31 through diode 34 and the base-emitter junction of transistor 32 to the negative terminal 19, bypassing amplifier 12. The voltage/current characteristics of diode 34 and the base-emitter junction of transistor 32 are similar and highly non-linear as illustrated in FIG. 3. The amplitude of the current in the alternate path through diode 34 and the base-emitter junction of transistor 32 is determined by the operating characteristics of the diode and the transistor. For devices suitable for use in regulator 30, this current is generally in the range of 0.03 to 0.15 microamperes.

As the total voltage V across diode 34 and the base-emitter junction of transistor 32, which is also the power supply voltage to amplifier 12, increases between approximately 0.9 and 1.0 volts, the current injected into the base of transistor 32 begins to increase rapidly. The current flowing into the base of transistor 32 causes an amplified current to flow through the emitter-collector path of the transistor and through resistor 33. The voltage drop caused by this current in resistor 33 is applied between the source electrode and the gate electrode of the field effect transistor 31. Transistor 32 is selected so that the pinch-off voltage is between 0.4 and 0.7 volts. An increase in the voltage across resistor 33 has the effect of increasing the resistance between the drain and source electrodes of transistor 31, thereby increasing the voltage drop across transistor 31 in the power input circuit for preamplifier 12. That is, an increase in the voltage applied to diode 34 increasing the current flowing through the diode, serves to decrease the power supply voltage V applied to pre-amplifier 12, stabilizing the power supply voltage.

If the external power supply voltage terminal 18 decreases, the voltage across the drain and source electrodes of transistor 31 tends to decrease. However, due to the extreme non-linear voltage/current characteristics of the circuit through diode 34 and the base-emitter junction of transistor 32, the current through this portion of the circuit tends to decrease out of proportion, causing an amplified decrease in the voltage drop across resistor 33 and a reduction in the drain to source impedance of FET 31. The reverse action occurs for an increase in voltage at terminal 18. This affords an effective voltage regulating action for the voltage V between the power supply terminal 22 of amplifier 12 and the external power terminal 19 that decreases the power supply voltage fluctuations for preamplifier 12 by a factor in excess of one hundred.

Even when there is very little voltage drop across resistor 33, transistor 31 has a finite channel resistance between its source and drain electrodes. The minimum power supply voltage is determined by this resistance and by the amount of current required for operation of preamplifier 12, the alternate circuit through diode 34, and the additional current through resistor 33 that is needed to afford sufficient collector current in transistor 32 to establish a reasonable beta factor.

In one application of this filter/regulator circuit 30, a typical value for power supply current required by preamplifier 22 is approximately twenty-five microamperes. The current through resistor 33 is approximately two to three microamperes. The additional current flowing through diode 34 is of the order of 0.08 microamperes. Thus, the total power supply current required is increased, due to the presence of the filter and voltage regulator circuit 30, from about twenty-five microamperes to somewhat less than twenty-nine microamperes. This increase in current is insignificant when compared to the total requirements imposed upon battery 15, inasmuch as the unfiltered microphone circuit, including preamplifier 12, rarely constitutes as much as ten percent of the total battery current for system 110.

From the foregoing description, it will be apparent that the miniature acoustical transducer system 110 illustrated in FIG. 2, which incorporates the combination filter and voltage regulator 30, affords improved operating characteristics as compared with prior art circuits such as the circuit of FIG. 1 but nevertheless requires no large capacitor that would necessitate an increase in the overall size of the transducer system. Circuit 30 is small enough to fit into a common housing with a microphone and preamplifier in a miniature acoustical transducer system suitable for hearing aids and like applications. The overall transducer system 110 may be made extremely compact in size, though inexpensive in construction, yet is highly effective and reliable in operation.

Figure 4:
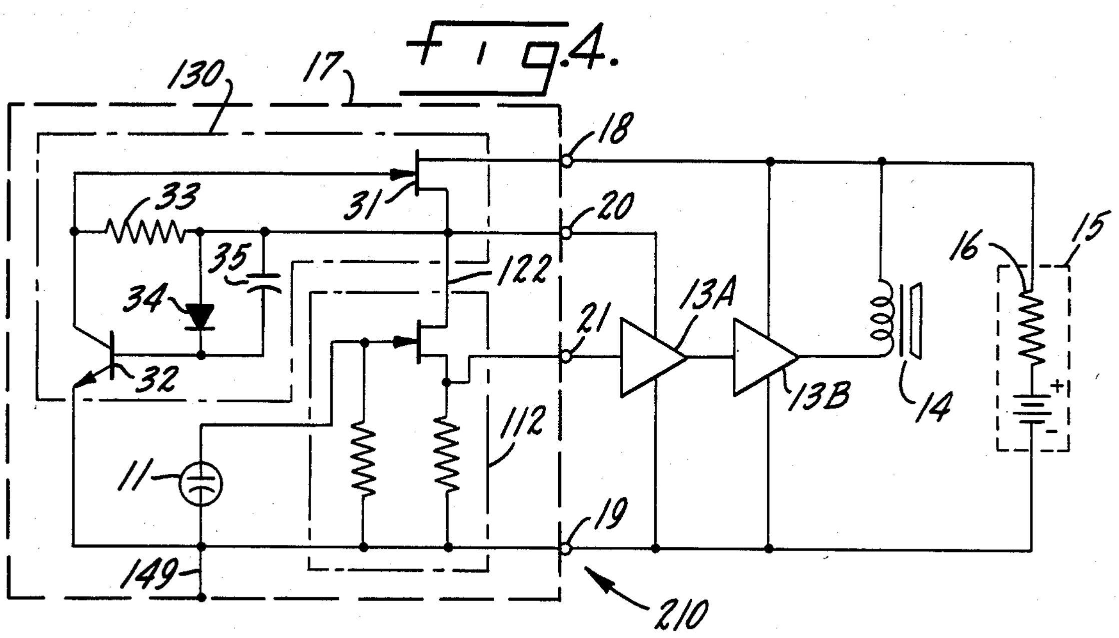
FIG. 4 is a schematic circuit diagram illustrating another embodiment of the present invention.

FIG. 4 provides a schematic circuit diagram illustrating another embodiment of the present invention, a miniature acoustical transducer system 210. In system 210, a microphone 11 is again connected to the signal input of a preamplifier circuit 112. The output of preamplifier 112 is connected, through a terminal 21, to a two stage amplifier 13A, 13B, with stage 13B driving a receiver or sound reproducer 14. As before, the power supply for microphone 11, amplifiers 12 and 13, and receiver 14 is a tiny battery 15 having an internal impedance 16. Microphone 11 and preamplifier 112 are again mounted within a common housing 17 having first and second external power terminals 18 and 19. In this instance, there is an additional power supply terminal 20 that is connected to amplifier stage 13A as explained below.

Preamplifier 112 utilizes a circuit shown in U.S. Pat. No. 3,816,671. Accordingly, no detailed description of amplifier 112 is required. The positive-polarity power input terminal for preamplifier 112 is indicated by reference numeral 122.

Transducer system 210, FIG. 4, further comprises a filter and voltage regulator circuit 130 which is essentially similar to the circuit 30 described above in connection with FIG. 2. Thus, the filter/regulator circuit 130 includes first and second semiconductor gate devices, comprising the field effect transistor 31 and the NPN transistor 32, together with resistor 33 and junction diode 34. In circuit 130, however, a small capacitor 35 is connected in parallel with diode 34.

The transducer system 210 illustrated in FIG. 4 provides substantial improvement in the dynamic regulating action of the system and lowers the level of electrical noise introduced at the preamplifier power terminal 122 due to noise voltages generated by the semiconductor gates in the filter and regulator circuit, as compared with the circuit of FIG. 2. Thus, the small capacitor 35 connected in parallel with diode 34 provides a low impedance path from the power input terminal 122 of preamplifier 112 to the base of transistor 32 for any high frequency voltage fluctuations (noise) that tend to develop at terminal 122. This low impedance AC path through capacitor 35 materially improves the dynamic regulation of the power supply for the preamplifier 112. Because the current through diode 34 and through the base-emitter junction of transistor 32 is extremely low, a compatively small capacitance, such as 0.001 microfarad, is quite effective. This capacitance is one thousand to ten thousand times smaller than is normally necessary in conventional filtering circuits.

In this embodiment the filtered and regulated power supply voltage from circuit 130 is also connected, through terminal 20, to amplifier 13A. The regulated supply voltage at terminal 20, approximately 0.95 volts, affords more stable and distortion-free operation for this stage of amplification.

Figure 5:
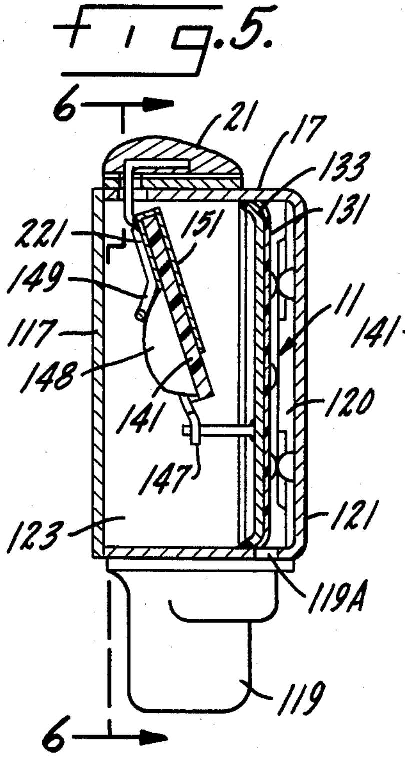
FIG. 5 is a sectional elevation view, on an enlarged scale, of a microphone and housing illustrating structural features of a preferred embodiment of the invention.
Figure 6:
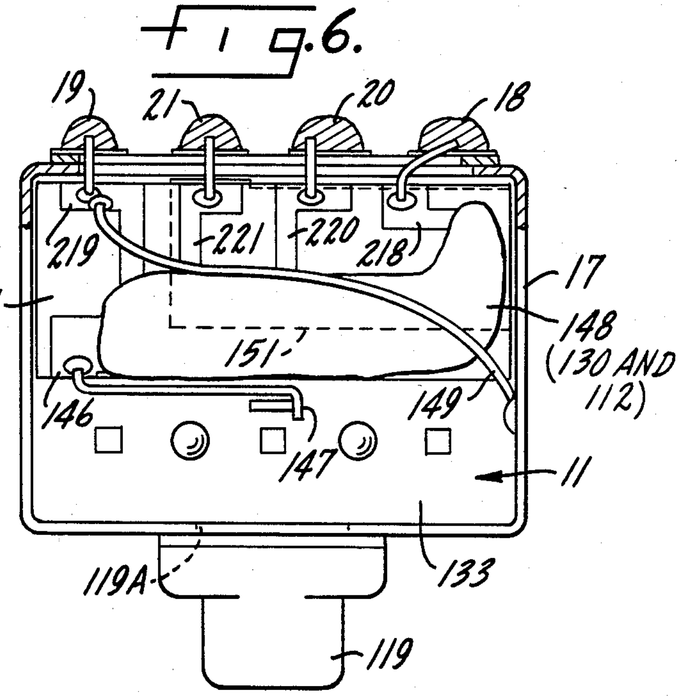
FIG. 6 is a view of the device of FIG. 5 taken approximately along line 6—6 therein.

FIGS. 5 and 6 illustrate a preferred form of physical implementation for the microphone 11, preamplifier 112, and filter/regulator 130 of the transducer system 210 illustrated in FIG. 4. The apparatus of FIGS. 5 and 6 comprises a cup-shaped housing 17 having its open end sealed by a cover 117 as shown in FIG. 5. An acoustic input tube 119 is mounted on one wall of housing 17. An opening 119A in the housing wall (FIG. 5) provides communication between input tube 119 and an acoustic chamber 120 within the housing. Chamber 120 is formed between the front wall 121 of housing 17 and a metal base plate 133 that is mounted within the housing. Base plate 133 supports a thin dielectric film 131 facing inwardly of acoustic chamber 120. Film 131 and its conductive base plate 133 constitute an electret assembly for microphone 11.

An insulator substrate 141 is mounted within a rear chamber 123 in transducer housing 17. The substrate 141 supports an encapsulated circuit 148 which includes the operating circuit elements for preamplifier 112 and filter/regulator circuit 130 (FIG. 4). Printed circuit elements 218–221 formed on one surface of substrate 141 are electrically connected to solder-type terminals 18–21, respectively, and afford electrical connections from those terminals to the operating circuits in the encapsulated circuit 148. There is an amplifier input connector 147 from the conductive base plate 133 that is a part of microphone 11 to a printed circuit conductor 146 on substrate 141; conductor 146 provides a connection to the input of amplifier 112 in circuit 148. A ground connector 149 is connected from housing 17 to the negative power supply terminal 19, more specifically to the printed circuit connector 219 associated therewith (FIG. 6).

Within the tiny transducer housing 17 (the largest dimension of this housing may be less than one-quarter inch) appreciable capacitive coupling is virtually inevitable between the individual printed circuit connectors 218–221 for terminals 18–21, on the one hand, and the operating elements of microphone 11, specifically the conductive base plate 133, on the other. For the most part, these individual stray capacitance couplings do not adversely affect operation of the transducer. The capacitive coupling between the microphone and the printed circuit connector 218 for external power supply terminal 18, on the other hand, can produce highly undesirable effects due to the presence of signal-frequency voltage fluctuations in this portion of the power supply, as previously discussed.

Figure 7:
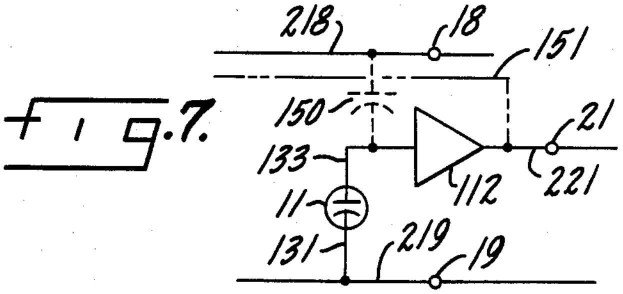
FIG. 7 is a fragmentary schematic circuit diagram used in explanation of FIGS. 5 and 6.

The capacitive coupling between printed circuit connector 218 (terminal 18) and the microphone is illustrated by the dash line capacitance 150 in FIG. 7. The capacitance 150 and the capacity of microphone 11 are seen to form a voltage divider that applies a fraction of any unwanted signal fluctuations appearing on terminal 18 to the input of preamplifier 112. Depending upon the physical construction of this portion of the transducer system, capacitance 150 may be large enough so that it limits the effectiveness of circuit 130 (FIG. 4) in eliminating the adverse effects of power supply fluctuations.

To further minimize the effects of any power supply voltage fluctuations, and to preserve the effectiveness of filter/regulator circuit 130, a conductive shield 151 (FIGS. 5 and 6) is interposed between microphone 11 and the power supply terminal 18 (and its printed circuit connector 218). Specifically, shield 151 is positioned between connector 218 and the base plate 133 that constitutes an integral part of microphone 11. Shield 151 may be connected to any portion of the operating circuit that does not carry the unwanted voltage fluctuations and has a low impedance relative to the negative power supply terminal 19. A preferred connection for shield 151 is to output terminal 21, through its printed circuit connector 221, since shield 151 then becomes a driven shield and the effect of any capacitance between the shield capacitance between the shield and microphone electrode 133, as a parasitic capacitance, is reduced. In the illustrated construction, shield 151 may be a conductive foil or the shield may comprise a printed circuit element formed on the surface of substrate 141 in conventional manner.

From the foregoing description, it will be seen that the miniature acoustical transducer system of the present invention, incorporating combination filter/voltage regulator circuits such as the circuits 30 and 130, provide for materially improved operating characteristics as compared with filter circuits used in the prior art without requiring the large capacitors characteristic of those prior art circuits. Thus, the filter/regulator circuits employed in the present invention are small enough so that they can fit into a common housing with a microphone and preamplifier in a miniaturized construction highly suitable for use in hearing aids and like applications, that requires no appreciable increase in the housing size. The regulated power supply provided by the invention can also be utilized to supply power to an additional amplifier stage for a sound reproducer (receiver) as shown in FIG. 4 for further reduction of distortion in the system output.

I claim:

1. In a miniature acoustical transducer system suitable for use in hearing aids and like applications, of the kind comprising a microphone connected to the signal input of an amplifier, the amplifier having first and second power terminals connected to a battery, the improvement comprising a combined filter and voltage regulator circuit interposed between the battery and the first power terminal of the amplifier, the filter/regulator circuit comprising:
   - a first semiconductor gate device having input, output, and control electrodes, the input electrode of the first gate device being connected to the battery and the output electrode of the first gate device being connected to the first power terminal of the amplifier;
   - a second semiconductor gate device having input, output, and control electrodes, the input electrode of the second gate device being connected to the second power terminal of the amplifier and to the battery and the output electrode of the second gate device being connected to the control electrode of the first gate device;
   - a resistance connected between the output and control electrodes of the first gate device;
   - and a junction diode connected between the output electrode of the first gate device and the control electrode of the second gate device;
   - the junction diode and the control electrode-input electrode junction of the second gate device each having a highly non-linear voltage/current characteristic.

2. A miniature transducer system according to claim 1 in which the first gate device is a field-effect transistor having drain and source electrodes as its input and output electrodes and a gate electrode as its control electrode.

3. A miniature transducer system according to claim 2 in which the second gate device is an NPN or PNP junction transistor, the emitter of the junction transistor constituting its input electrode, and the emitter-base junction of that transistor having a highly non-linear voltage/current characteristic similar to the voltage/current characteristic of the diode.

4. A miniature transducer system according to claim 1 and further comprising a small filter capacitor connected in parallel with the diode.

5. A miniature transducer system according to claim 4 in which the first gate device is a field-effect transistor having drain and source electrodes as its input and output electrodes and a gate electrode as its control electrode.

6. A miniature transducer system according to claim 5 in which the second gate device is an NPN or PNP junction transistor, the emitter of the junction transistor constituting its input electrode, and the emitter-base junction of that transistor having a highly non-linear voltage/current characteristic similar to the voltage/-current characteristic of the diode.

7. A miniature transducer system according to claim 1, and further comprising:

a housing in which the microphone, the amplifier, and the filter/regulator circuit are all mounted;

and terminal means, accessible externally of the housing, including first and second battery connection terminals connected to the filter/regulator circuit and amplifier, respectively, and an output terminal for the amplifier.

8. A miniature transducer system according to claim 7, and further comprising:

a conductive shield member disposed within the housing between the first battery connection terminal and the microphone, the shield being electrically connected to a point in the overall circuit having a low impedance relative to the second battery connection terminal.

9. A miniature transducer system according to claim 8 in which the shield is electrically connected to the amplifier output terminal to function as a driven shield.

10. A miniature transducer system according to claim 7 in which the terminal means further includes a regulated power output terminal, accessible externally of the housing, that is connected to the output electrode of the first gate device.

11. A miniature transducer system according to claim 7 in which the first gate device is a field-effect transistor having drain and source electrodes as its input and output electrodes and a gate electrode at its control electrode.

12. A miniature transducer system according to claim 11 in which the second gate device is an NPN or PNP junction transistor, the emitter of the junction transistor constituting its input electrode, and the emitter-base junction of that transistor having a highly non-linear voltage/current characteristic similar to the voltage/-current characteristic of the diode.

13. A miniature transducer system according to claim 12 and further comprising a small filter capacitor connected in parallel with the diode.

14. A miniature transducer system according to claim 12 and further comprising:

a conductive shield member disposed within the housing between the first battery connection terminal and the microphone, the shield being electrically connected to a point in the overall circuit having a low impedance relative to the second battery connection terminal.

15. A miniature transducer system according to claim 14 in which the shield is electrically connected to the amplifier output terminal to function as a driven shield.

16. A miniature transducer system according to claim 14 in which the terminal means further includes a regulated power output terminal, accessible externally of the housing, that is connected to the output electrode of the first gate device.

17. A miniature transducer system according to claim 16 and further comprising a small filter capacitor connected in parallel with the diode.

* * * * *